(12) United States Patent
Ikeda et al.

(10) Patent No.: US 6,319,623 B1
(45) Date of Patent: Nov. 20, 2001

(54) MAGNETO-OPTICAL RECORDING MEDIUM

(75) Inventors: Etsuro Ikeda; Hiroshi Miura, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/497,712

(22) Filed: Feb. 4, 2000

(30) Foreign Application Priority Data

Feb. 9, 1999 (JP) .................................................. 11-031552

(51) Int. Cl.$^7$ ...................................................... G11B 5/66
(52) U.S. Cl. ........................... 428/694 ML; 428/694 SC; 428/694 DE; 428/694 RE; 428/694 XS; 428/900; 428/64.3; 369/13
(58) Field of Search ..................... 428/694 ML, 694 SC, 428/694 DE, 694 RE, 694 XS, 900, 64.3; 369/13

(56) References Cited

U.S. PATENT DOCUMENTS

| | | | | |
|---|---|---|---|---|
| 5,585,197 | * | 12/1996 | Ikeda ..................... | 428/611 |
| 5,593,789 | * | 1/1997 | Utsunomiya ................... | 428/694 ML |
| 5,595,805 | * | 1/1997 | Nakayama ........................... | 428/64.3 |
| 5,667,862 | * | 9/1997 | Nahone ............................... | 428/64.3 |
| 5,838,444 | | 11/1998 | Io ......................................... | 356/369 |

FOREIGN PATENT DOCUMENTS

| | | |
|---|---|---|
| 0314424 | 5/1989 | (EP) . |
| 63-032748 | 2/1988 | (JP) . |
| 63-103456 | 5/1988 | (JP) . |
| 3-066948 | 3/1991 | (JP) . |
| 4-089641 | 3/1992 | (JP) . |
| 6-111405 | 4/1994 | (JP) . |
| 6-150415 | 5/1994 | (JP) . |

* cited by examiner

Primary Examiner—Leszek Kiliman
(74) Attorney, Agent, or Firm—Sonnenschein, Nath & Rosenthal

(57) ABSTRACT

A magneto-optical recording medium is disclosed with which magneto-optical recording is performed by a magnetic-field modulation method and which enables stable recording characteristics to be realized even if the intensity of the recording magnetic field is somewhat changed. When a magneto-optical recording medium incorporating a signal recording layer made of TbFeCoCr and arranged such that a magneto-optical recording operation is performed with respect to the signal recording layer by the magnetic-field modulation method is manufactured, the signal recording layer is formed such that the total quantity of Tb and Cr contained in the signal recording layer is 24±1 at %. After the signal recording layer has been formed, exposure to stem by $30\times10^{-6}$ Torr·sec to $10000\times10^{-6}$ Torr·sec or exposure to oxygen by $10\times10^{-6}$ Torr·sec to $50\times10^{-6}$ Torr·sec is performed to oxidize the surface of the signal recording layer.

5 Claims, 1 Drawing Sheet

MAGNETO-OPTICAL RECORDING MEDIUM

RELATED APPLICATION DATA

The present application claims priority to Japanese Application No. P11-031552 filed Feb. 9, 1999 which application is incorporated herein by reference to the extent permitted by law.

BACKGROUND OF THE INVENTION

1. Field of the Invention

The present invention relates to a magneto-optical recording medium which incorporates a signal recording layer constituted by a thin film made of an alloy of a rare earth element and transition metal and with which magneto-optical recording with respect to the signal recording layer is performed by a magnetic-field modulation method and a manufacturing method therefor.

2. Description of the Related Art

A magneto-optical recording medium has been put into practical use as an erasable recording medium exhibiting a high recording density. The magneto-optical recording medium incorporates a signal recording layer constituted by a thin film made of an alloy of a rare earth element and transition metal which has vertical magnetic anisotropy. Thus, magneto-optical recording is performed so that a required signal is recorded.

The magneto-optical recording operation is performed such that the signal recording layer is irradiated with a laser beam to raise the temperature of each of small regions in the signal recording layer. Moreover, a recording magnetic field of about 200±100 Oe is applied to a region in the vicinity of the region heated owing to irradiation with the laser beam. Thus, the direction of magnetization of only the regions of the signal recording layer which have been heated owing to irradiation with the laser beam is changed to a direction corresponding to the signal, which must be recorded. As a result, the signal is recorded as the direction of the magnetization of the signal recording layer.

The magneto-optical recording method includes a light-intensity modulation method and a magnetic-field modulation method. The light-intensity modulation method is a method of modulating the intensity of the laser beam with which the signal recording layer is irradiated is modulated in response to the signal which must be recorded. The magnetic-field modulation method is a method of modulation the intensity of the recording magnetic field, which must be applied to the signal recording layer, is modulated in response to the signal which must be recorded.

The magnetic-field modulation method, which is one of the magneto-optical recording methods, is required to, at high speed, switches the polarity of the recording magnetic field in response to the signal which must be recorded. When the polarity of the recording magnetic field is switched at high speed, a great magnetic field cannot easily be applied. Therefore, when the magnetic-field modulation method is employed, there is a necessity that sufficient recording can be performed even with a weak magnetic field of about 100 Oe even if the polarity of the recording magnetic field is switched at high speed.

Therefore, when the magnetic-field modulation method is employed, the magneto-optical recording medium must have substantially the same recording characteristics in a range of the magnetic field from about 100 Oe to about 300 Oe. Namely, the magneto-optical recording medium adapted to the magnetic-field modulation method must have stable recording characteristics even if the intensity of the recording magnetic field is somewhat changed.

To meet the above-mentioned requirement, a means has been devised with which the signal recording layer is formed into a laminate structure to improve the characteristics of the signal recording layer. When the signal recording layer is formed into the laminate structure, there arises a problem in that the manufacturing process becomes too complicated.

Therefore, another method has been devised with which the surface of the signal recording layer is oxidized to improve the characteristics of the signal recording layer. When the surface of the signal recording layer is oxidized, the signal recording layer is formed into a substantially two-layer structure. As a result, the characteristics of the signal recording layer can be improved. That is, oxidation of the surface of the signal recording layer enables a signal recording layer having a substantially laminate structure to be obtained without a necessity using plural types of magnetic materials to form the signal recording layer. Hence it follows that the characteristics of the signal recording layer can be improved.

However, oxidation of the signal recording layer cannot always improve the characteristics. The characteristics sometimes deteriorate according to the oxidizing conditions. In particular, excessive oxidation of the signal recording layer excessively deteriorate the recording characteristic of the manufactured magnetic recording medium.

SUMMARY OF THE INVENTION

In view of the foregoing, an object of the present invention is to provide a magneto-optical recording medium of a type adapted to a magnetic-field modulation method to perform a magneto-optical recording operation and structured to incorporate a signal recording layer which is oxidized so as to realize stable recording characteristic even if the intensity of the recording magnetic field is somewhat changed and a manufacturing method therefor.

According to an aspect of the present invention, there is provided a magneto-optical recording medium comprising: a disc substrate on which a first dielectric layer, a signal recording layer constituted by a thin film made of an alloy of a rare earth element and transition metal, an oxidized layer formed by oxidizing the surface of the signal recording layer, a second dielectric layer, a light reflecting layer and a protective layer are sequentially formed so that magneto-optical recording of the signal recording layer is performed by a magnetic-field modulation method, wherein the signal recording layer is made of TbFeCo and Tb is contained in the signal recording layer in a quantity of 23.5±1 at %.

The magneto-optical recording medium according to the present invention has the structure that the composition of the signal recording layer is determined as described above. Moreover, the signal recording layer having the oxidized surface is employed. Therefore, substantially the same recording characteristics can be obtained in a range of the recording magnetic field of 100 Oe to 300 Oe.

According to another aspect of the present invention, there is provided a method of manufacturing a magneto-optical recording medium which incorporates a signal recording layer made of TbFeCoCr so that magneto-optical recording of the signal recording layer is performed by a magnetic-field modulation method, the method of manufacturing a magneto-optical recording medium comprising the steps of: forming the signal recording layer such that the total quantity of Tb and Cr contained in the signal recording layer is 24±1 at %; and exposing the formed signal recording layer to steam at 30×10⁻⁶ Torr·sec to 10000×10⁻⁶ Torr·sec or oxygen at 10×10⁻⁶ Torr·sec to 50×10⁻⁶ Torr·sec so that the surface of the signal recording layer is oxidized.

The method of manufacturing a magneto-optical recording medium according to the present invention has the structure that the composition of the signal recording layer is determined as described above. Moreover, the signal recording layer is oxidized under the foregoing conditions. Therefore, the recording characteristics of the magneto-optical recording medium can be substantially the same in a range of the magnetic field from 100 Oe to 300 Oe.

According to another aspect of the present invention, there is provided a method of manufacturing a magneto-optical recording medium which incorporates a signal recording layer made of TbFeCo so that magneto-optical recording of the signal recording layer is performed by a magnetic-field modulation method, the method of manufacturing a magneto-optical recording medium comprising the steps of: forming the signal recording layer such that the quantity of Tb contained in the signal recording layer is 23.5±1 at %; and exposing the formed signal recording layer to steam at 30×10⁻⁶ Torr·sec to 10000×10⁻⁶ Torr·sec or oxygen at 10×10⁻⁶ Torr·sec to 50×10⁻⁶ Torr·sec so that the surface of the signal recording layer is oxidized.

The method of manufacturing a magneto-optical recording medium according to the present invention has the structure that the composition of the signal recording layer is determined as described above. Moreover, the signal recording layer having the oxidized surface is employed. Therefore, substantially the same recording characteristics can be obtained in a range of the recording magnetic field of 100 Oe to 300 Oe.

Other objects, features and advantages of the invention will be evident from the following detailed description of the preferred embodiments described in conjunction with the attached drawings.

DESCRIPTION OF THE PREFERRED EMBODIMENTS

Figure 1:
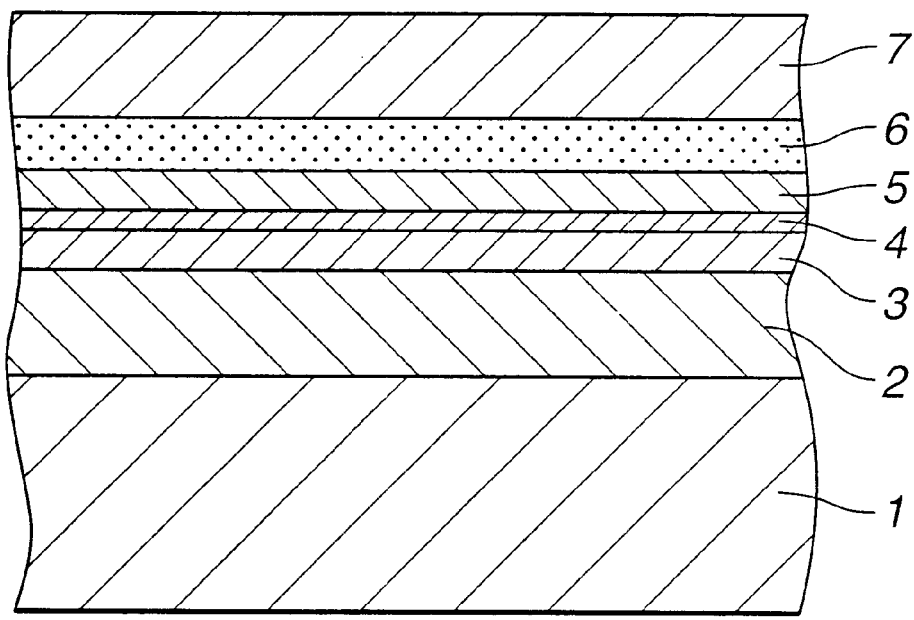
FIG. 1 is a diagram showing an example of the structure of films constituting a magneto-optical recording medium according to the present invention.

An embodiment of the present invention will now be described with reference to the drawings.

An example of a magneto-optical recording medium according to the present invention is shown in FIG. 1. The magneto-optical recording medium according to this embodiment is a magneto-optical recording medium adapted to a magnetic-field modulation method to perform a magneto-optical recording operation. The magneto-optical recording medium incorporates a disc substrate 1 on which a first dielectric layer 2, a signal recording layer 3, an oxidized layer 4 formed by oxidizing the surface of the signal recording layer 3, a second dielectric layer 5 and a light reflecting layer 6 are sequentially laminated in the foregoing order. Moreover, a protective layer 7 is formed on the foregoing laminated films.

The disc substrate 1 is obtained by injection-molding a plastic material, such as polycarbonate, into a disc shape. The disc substrate 1 may have a pit and projection pattern corresponding to a servo signal and an address signal and a pit and projection pattern, such as lands and grooves, formed along the recording track. When the lands and grooves are formed, the lands and the grooves may be meandered to impart address information to the lands and the grooves.

The first and second dielectric layers 2 and 5 are made of, for example, SiN. When the first dielectric layers 2 and 5 are made of SiN, each of the SiN films is formed by sputtering, for example, a Si target in an atmosphere containing nitrogen.

The signal recording layer 3 is constituted by a thin film made of an alloy of a rare earth element and transition metal having vertical magnetic anisotropy. A signal which must be recorded on the magneto-optical recording medium is recorded as the direction of the magnetization of the signal recording layer 3.

The signal recording layer 3 is formed by sputtering TbFeCo or TbFeCoCr.

When the signal recording layer 3 is made of TbFeCo, the quantity of Tb contained in the signal recording layer 3 is 23.5±1 at %. When the composition of the signal recording layer 3 is expressed as $Tb_x(FeCo)_{100-x}$, the quantity of contained Tb is 22.5 at %≦x≦24.5 at %. The composition of the signal recording layer 3 is determined as described above. Therefore, the recording characteristics of the magneto-optical recording medium can be substantially the same in the range of the recording magnetic field from 100 Oe to 300 Oe as can be understood from results of experiment to be described later.

When the signal recording layer 3 is made of TbFeCoCr, the total quantity of Tb and Cr contained in the signal recording layer 3 is 24±1 at %. That is, when the composition of the signal recording layer 3 is expressed as $Tb_x(FeCo)_{100-x-y}Cr_y$, the total quantity is 23 at %≦x+y≦25 at %. The composition of the signal recording layer 3 is determined as described above. Therefore, the recording characteristics of the magneto-optical recording medium can be substantially the same in the range of the recording magnetic field from 100 Oe to 300 Oe as can be understood from results of experiment to be described later.

The oxidized layer 4 is formed by exposing the surface of the formed signal recording layer 3 to an atmosphere containing oxygen or steam so as to oxidize the surface of the signal recording layer 3.

The operation for exposing the surface of the signal recording layer 3 to the atmosphere containing oxygen is called "exposure to oxygen". Moreover, a product of the partial pressure of oxygen when the exposure to oxygen is performed and time for which exposure to oxygen is performed is called a "quantity of exposure to oxygen". On the other hand, a product of the partial pressure of steam when exposure to steam is performed and time for which exposure to steam is performed is called a "quantity of exposure to steam".

When the oxidized layer 4 is formed by oxidizing the signal recording layer 3 by performing the exposure to oxygen, the quantity of exposure to oxygen is made to be 10×10⁻⁶ Torr·sec to 50×10⁻⁶ Torr·sec. Since the quantity of exposure to oxygen when the oxidized layer 4 is formed is determined as described above, the recording characteristics of the magneto-optical recording medium can be substantially the same in the range of the recording magnetic field from 100 Oe to 300 Oe as can be understood from results of experiment to be described later.

When the oxidized layer 4 is formed by oxidizing the signal recording layer 3 by performing exposure to steam, the quantity of exposure to steam is made to be 30×10⁻⁶ Torr·sec to 10000×10⁻⁶ Torr·sec. Since the quantity of exposure to steam when the oxidized layer 4 is formed is determined as described above, the recording characteristics of the magneto-optical recording medium can be substantially the same in the range of the recording magnetic field from 100 Oe to 300 Oe as can be understood from results of experiment to be described later.

The light reflecting layer 6 reflects the laser beam made incident when the signal is recorded/reproduced and quickly diffuses heat in the regions heated owing to irradiated with the incident laser beam. The light reflecting layer 6 is made of, for example, Al and Al alloy and formed by a sputtering method or an evaporating method.

The protective layer 7 protects films laminated on the disc substrate 1, the protective layer 7 being made of, for example, ultraviolet-ray hardening resin.

An example of a method of manufacturing the magneto-optical recording medium will now be described.

When the magneto-optical recording medium is manufactured, a plastic material, such as polycarbonate, is injection-molded so that the disc substrate 1 is manufactured. At this time, the pit and projection pattern corresponding to the servo signal and the address signal and the pit and projection pattern, such as lands and grooves formed along the recording tracks, may be provided for the disc substrate 1. When the lands and grooves are formed, the lands and grooves may be meandered to impart address information to the lands and grooves.

Then, the disc substrate 1 is introduced into a vacuum sputtering apparatus so that the first dielectric layer 2 is formed on the disc substrate 1 by the sputtering method. Specifically, the Si target is sputtered in an atmosphere containing nitrogen so that the first dielectric layer 2 made of SiN is formed on the disc substrate 1.

Then, the sputtering operation is performed so that the signal recording layer 3 is formed on the first dielectric layer 2. Specifically, an alloy target made of TbFeCo or TbFeCoCr is sputtered in an argon atmosphere so that the signal recording layer 3 made of TbFeCo or TbFeCoCr is formed on the first dielectric layer 2.

When the alloy target made of TbFeCo is employed, the quantity of Tb contained in the alloy target is made to be 23.5±1 at %. Also the quantity of Tb contained in the formed signal recording layer 3 is made to be 23.5±1 at %. That is, when the composition of the signal recording layer 3 is expressed as $Tb_x(FeCo)_{100-x}$, the foregoing quantity is 22.5 at $\% \leq x \leq 24.5$ at %.

Then, the surface of the signal recording layer 3 is exposed to an atmosphere containing oxygen or an atmosphere containing steam so that exposure to oxygen or exposure to steam is performed. Thus, the oxidized layer 4 is formed on the signal recording layer 3.

When the oxidized layer 4 is formed by oxidizing the signal recording layer 3 by performing the exposure to oxygen, the quantity of exposure to oxygen is made to be $10 \times 10^{-6}$ Torr·sec to $50 \times 10^{-6}$ Torr·sec. Since the quantity of exposure to oxygen when the oxidized layer 4 is formed is determined as described above, the recording characteristics of the magneto-optical recording medium can be substantially the same in the range of the recording magnetic field from 100 Oe to 300 Oe as can be understood from results of experiment to be described later.

When the oxidized layer 4 is formed by oxidizing the signal recording layer 3 by performing the exposure to steam, the quantity of exposure to steam is made to be $30 \times 10^{-6}$ Torr·sec to $10000 \times 10^{-6}$ Torr·sec. Since the quantity of exposure to steam when the oxidized layer 4 is formed is determined as described above, the recording characteristics of the magneto-optical recording medium can be substantially the same in the range of the recording magnetic field from 100 Oe to 300 Oe as can be understood from results of experiment to be described later.

Then, a sputtering operation is performed so that the second dielectric layer 5 is formed on the oxidized layer 4. Specifically, for example, a Si target is sputtered in an atmosphere containing nitrogen so that a second dielectric layer 5 made of SiN is formed on the oxidized layer 4.

Then, a sputtering method or an evaporating method is employed to form the light reflecting layer 6 made of Al and Al alloy and so forth.

Then, the protective layer 7 made of ultraviolet-ray hardening resin and so forth is formed on the light reflecting layer 6. Specifically, a spin coating method is employed to coat the surface of the light reflecting layer 6 with ultraviolet-ray hardening resin. Then, the ultraviolet-ray hardening resin is irradiated with ultraviolet rays so that the ultraviolet-ray hardening resin is hardened. As a result, the protective layer 7 made of the ultraviolet-ray hardening resin is formed.

After the foregoing processes have been performed, a magneto-optical recording medium is manufactured which, as shown in FIG. 1, incorporates the disc substrate 1 on which the first dielectric layer 2, the signal recording layer 3, the oxidized layer 4, the second dielectric layer 5, the light reflecting layer 6 and the protective layer 7 are formed.

Then, a plurality of samples of the foregoing magneto-optical recording medium were manufactured such that the composition of the signal recording layer 3 and the quantity of exposure to steam or quantity of exposure to oxygen when the oxidized layer 4 was formed were changed. Thus, the recording characteristics of the samples were evaluated as follows.

The disc substrate 1 was formed by injection-molding the polycarbonate resin, the disc substrate 1 having a diameter of 65 mm and a thickness of 1.2 mm.

The first dielectric layer 2 was made of SiN. Specifically, the Si target was sputtered in an atmosphere containing nitrogen. At this time, the SiN film was formed under conditions that the electric power for performing the sputtering operation was 3 kW and the pressure of the sputtering gas was 5 mTorr. The sputtering gas was mixed gas of Ar and $N_2$. The ratio of Ar and $N_2$ was 3:2.

The signal recording layer 3 was made of TbFeCo or TbFeCoCr. Specifically, an alloy target made of TbFeCo or TbFeCoCr was sputtered in an argon atmosphere so that the signal recording layer 3 was formed. At this time, the signal recording layer 3 was formed under conditions that the electric power for performing the sputtering operation was 0.8 kW and the pressure of the sputtering gas was 4 mTorr.

The composition of the signal recording layer 3 of each sample was varied. Moreover, the quantity of exposure to steam and that of exposure to oxygen when the signal recording layer 3 was oxidized by performing exposure to oxygen or exposure to steam to form the oxidized layer 4 were varied among the samples.

The second dielectric layer 5 was made of SiN. Specifically, the Si target was sputtered in an atmosphere containing nitrogen so that the second dielectric layer 5 was formed. At this time, the SiN film was formed under conditions that the electric power for performing the sputtering operation was 3 kW and the pressure of the sputtering gas was 5 mTorr. The sputtering gas was mixed gas of Ar and $N_2$. The ratio of Ar and $N_2$ was 3:2.

The light reflecting layer 6 was made of Al and Al alloy. Specifically, the light reflecting layer 6 was formed by sputtering an Al and Al alloy target in an argon atmosphere. The Al and Al alloy film was formed under conditions that the electric power for performing the sputtering operation was 2 kW and the pressure of the sputtering gas was 4 mTorr.

As described above, the composition of the signal recording layer 3 and the conditions under which the surface of the signal recording layer 3 was oxidized were varied among the samples. The other conditions were the same among the samples to make comparisons of the recording characteristics.

The composition of the alloy target made of TbFeCo or TbFeCoCr was analyzed by a glow discharge mass analyzing method. Moreover, a thin film having a thickness of 500 nm was formed on the Si substrate by using the foregoing alloy target. The composition of the formed thin film was analyzed by an electron microprobe analyzing (EPMA) method. As a result, a fact was confirmed that the composition of the alloy target and that of the thin film formed by using the alloy target were substantially the same. As for the composition of the signal recording layer 3, the analyzed composition of the alloy target for use to form the signal recording layer 3 was employed as the composition of the signal recording layer 3.

When the oxidized layer 4 was formed by performing exposure to oxygen, the flow rate of $O_2$, which must be introduced from the gas cylinder, was adjusted by a variable valve. The partial pressure of oxygen was measured by a quadrupole-type mass analyzer. Moreover, time for which the signal recording layer 3 was exposed to the oxygen atmosphere was measured. The product of the obtained values was calculated so that the quantity of exposure to oxygen was obtained.

When the oxidized layer 4 was formed by performing exposure to steam, the flow rate of $H_2O$, which must be introduced from the gas cylinder, was adjusted by a variable valve. The partial pressure of steam was measured by a quadrupole-type mass analyzer. Moreover, time for which the signal recording layer 3 was exposed to the steam atmosphere was measured. The product of the obtained values was calculated so that the quantity of exposure to steam was obtained.

When the recording characteristics of the samples were measured, magneto-optical recording operations were performed by the magnetic-field modulation method to record signals. At this time, the linear velocity was made to be constant velocity of 1.2 m/sec. A single-frequency signal having a frequency of 720 kHz was recorded in a portion of regions with a recording magnetic field of 300 Oe. Moreover, the signal was recorded in each of the other regions with the recording magnetic field of 100 Oe. Then, the recording signals were reproduced so that C/N was measured.

Then, the difference $\Delta C/N$ between C/N detected when the signal recorded with the recording magnetic field of 300 Oe was reproduced and C/N detected when the signal recorded with the recording magnetic field of 100 Oe was reproduced was obtained. If $\Delta C/N$ was not larger than 1 dB, a determination was made that the sample was suitable to magneto-optical recording adapted to the magnetic-field modulation method. If $\Delta C/N$ was larger than 1 dB, a determination was made that the sample was not suitable to magneto-optical recording adapted to the magnetic-field modulation method.

Results of evaluation of the recording characteristics of each of the plural samples were shown in Tables 1 to 6. The measured quantity of Tb, quantity of Cr and the total quantity of Tb and Cr contained in the signal recording layer 3, the quantity of exposure to oxygen and that of exposure to steam when the signal recording layer 3 was subjected to the oxidization process were shown in Tables 1 to 6.

TABLE 1

| Sample No. | Tb (at %) | Cr (at %) | Tb + Cr (at %) |
|---|---|---|---|
| 1 | 14.7 | 7.8 | 22.5 |
| 2 | 15.2 | 8.0 | 23.2 |
| 3 | 16.5 | 8.1 | 24.6 |
| 4 | 16.6 | 6.1 | 22.7 |
| 5 | 17.1 | 5.9 | 23.0 |
| 6 | 18.5 | 6.2 | 24.7 |
| 7 | 19.8 | 2.9 | 22.7 |
| 8 | 20.3 | 2.8 | 23.1 |
| 9 | 21.2 | 3.1 | 24.3 |
| 10 | 21.3 | 1.5 | 22.8 |
| 11 | 21.7 | 1.3 | 23.0 |
| 12 | 22.5 | 1.5 | 24.0 |
| 13 | 22.1 | 0 | 22.1 |
| 14 | 22.6 | 0 | 22.6 |
| 15 | 23.5 | 0 | 23.5 |

| Sample No. | Quantity of Exposure to Oxygen (Torr · sec) | $\Delta C/N$ (dB) | Evaluation |
|---|---|---|---|
| 1 | $40 \times 10^{-6}$ | 1.4 | X |
| 2 | $40 \times 10^{-6}$ | 0.6 | ○ |
| 3 | $40 \times 10^{-6}$ | 0.8 | ○ |
| 4 | $40 \times 10^{-6}$ | 1.5 | X |
| 5 | $40 \times 10^{-6}$ | 0.9 | ○ |
| 6 | $40 \times 10^{-6}$ | 0.8 | ○ |
| 7 | $40 \times 10^{-6}$ | 1.8 | X |
| 8 | $40 \times 10^{-6}$ | 0.9 | ○ |
| 9 | $40 \times 10^{-6}$ | 0.8 | ○ |
| 10 | $40 \times 10^{-6}$ | 1.9 | X |
| 11 | $40 \times 10^{-6}$ | 1.0 | ○ |
| 12 | $40 \times 10^{-6}$ | 0.9 | ○ |
| 13 | $40 \times 10^{-6}$ | 2.1 | X |
| 14 | $40 \times 10^{-6}$ | 1.0 | ○ |
| 15 | $40 \times 10^{-6}$ | 0.8 | ○ |

Table 1 showed results of evaluation of the recording characteristics of a plurality of samples manufactured such that the composition of the signal recording layer 3 was varied. All of the samples shown in Table 1 incorporated the signal recording layer oxidized under the same condition that exposure to oxygen was performed in a quantity of $40 \times 10^{-6}$ Torr·sec.

As shown in Table 1, when the signal recording layer 3 was made of TbFeCoCr, $\Delta C/N$ was not larger than 1 dB when the total quantity of Tb and Cr was 23 at % or larger regardless of the composition ratio of Tb and Cr.

When the signal recording layer 3 is made of TbFeCoCr, it is preferable that the total quantity of Tb and Cr contained in the signal recording layer 3 is 23 at % or higher regardless of the composition ratio of Tb and Cr. Namely, the quantity of contained Cr is reduced, it is preferable that the quantity of contained Tb is correspondingly enlarged such that the total quantity of Tb and Cr is 23 at % or larger.

When the signal recording layer 3 is made of TbFeCoCr, excessive enlargement of Tb and Cr causes C/N to deteriorate. The reason for this will now be described. The signals recorded on the magneto-optical recording medium are held by sublattice magnetization of the transition metal contained in the signal recording layer 3. Therefore, rise in the rare-earth metal results in deterioration in the quality of the signal.

Specifically, when the quantity of Tb contained in the signal recording layer 3 is enlarged by 1 at %, C/N deteriorates by about 0.4 dB. It is undesirable that the quantity of Tb and Cr is enlarged excessively if ΔC/N is small. Therefore, it is preferable that the total quantity of Tb and Cr is close to 23 at % where possible.

When the alloy target is manufactured, the composition somewhat disperses. Therefore, it is difficult to always maintain the quantity of Tb and Cr contained in the signal recording layer 3 at 23 at %. Therefore, it is preferable that the actual manufacturing process is performed such that the quantity of Tb and Cr contained in the signal recording layer 3 is about 24±1% in consideration of the margin in the process for manufacturing the alloy target.

When the signal recording layer was made of TbFeCo (that is, when Cr=0 at %), ΔC/N was, as shown in Table 1, 1 dB or smaller if the quantity of Tb contained in the signal recording layer 3 was 22.6 at % or larger.

Also in a case where the signal recording layer 3 is made of TbFeCo, excessive enlargement of Tb causes C/N to deteriorate similar to the case where the signal recording layer 3 is made of TbFeCoCr. Therefore, it is undesirable that the quantity of contained Tb is enlarged excessively if ΔC/N is small. Therefore, it is preferable that the quantity of Tb contained in the signal recording layer 3 is close to 22.6 at % where possible.

When the alloy target is manufactured, the composition somewhat disperses as described above. Therefore, it is difficult to always maintain the quantity of Tb contained in the signal recording layer 3 at 22.6 at %. Therefore, it is preferable that the actual manufacturing process is performed such that the quantity of Tb contained in the signal recording layer 3 is about 23.5±1% in consideration of the margin in the process for manufacturing the alloy target.

TABLE 2

| Sample No. | Tb (at %) | Cr (at %) | Tb + Cr (at %) |
|---|---|---|---|
| 16 | 15.2 | 8.0 | 23.2 |
| 17 | 15.2 | 8.0 | 23.2 |
| 18 | 15.2 | 8.0 | 23.2 |
| 19 | 15.2 | 8.0 | 23.2 |
| 20 | 15.2 | 8.0 | 23.2 |
| 21 | 15.2 | 8.0 | 23.2 |
| 22 | 15.2 | 8.0 | 23.2 |
| 23 | 15.2 | 8.0 | 23.2 |

| Sample No. | Quantity of Exposure to Steam (Torr · sec) | Quantity of Exposure to Oxygen (Torr · sec) | ΔC/N (dB) | Evaluation |
|---|---|---|---|---|
| 16 | $27 \times 10^{-6}$ | — | 1.6 | X |
| 17 | $11000 \times 10^{-6}$ | — | 1.4 | X |
| 18 | — | $8 \times 10^{-6}$ | 1.4 | X |
| 19 | — | $60 \times 10^{-6}$ | 1.5 | X |
| 20 | $30 \times 10^{-6}$ | — | 0.9 | ○ |
| 21 | $10000 \times 10^{-6}$ | — | 0.9 | ○ |
| 22 | — | $11 \times 10^{-6}$ | 0.7 | ○ |
| 23 | — | $50 \times 10^{-6}$ | 0.8 | ○ |

TABLE 3

| Sample No. | Tb (at %) | Cr (at %) | Tb + Cr (at %) |
|---|---|---|---|
| 24 | 17.1 | 5.9 | 23.0 |
| 25 | 17.1 | 5.9 | 23.0 |
| 26 | 17.1 | 5.9 | 23.0 |
| 27 | 17.1 | 5.9 | 23.0 |
| 28 | 17.1 | 5.9 | 23.0 |
| 29 | 17.1 | 5.9 | 23.0 |
| 30 | 17.1 | 5.9 | 23.0 |
| 31 | 17.1 | 5.9 | 23.0 |

| Sample No. | Quantity of Exposure to Steam (Torr · sec) | Quantity of Exposure to Oxygen (Torr · sec) | ΔC/N (dB) | Evaluation |
|---|---|---|---|---|
| 24 | $26 \times 10^{-6}$ | — | 1.7 | X |
| 25 | $11000 \times 10^{-6}$ | — | 1.6 | X |
| 26 | — | $7 \times 10^{-6}$ | 1.7 | X |
| 27 | — | $57 \times 10^{-6}$ | 1.8 | X |
| 28 | $31 \times 10^{-6}$ | — | 0.8 | ○ |
| 29 | $10000 \times 10^{-6}$ | — | 0.9 | ○ |
| 30 | — | $10 \times 10^{-6}$ | 0.9 | ○ |
| 31 | — | $49 \times 10^{-6}$ | 1.0 | ○ |

TABLE 4

| Sample No. | Tb (at %) | Cr (at %) | Tb + Cr (at %) |
|---|---|---|---|
| 32 | 20.3 | 2.8 | 23.1 |
| 33 | 20.3 | 2.8 | 23.1 |
| 34 | 20.3 | 2.8 | 23.1 |
| 35 | 20.3 | 2.8 | 23.1 |
| 36 | 20.3 | 2.8 | 23.1 |
| 37 | 20.3 | 2.8 | 23.1 |
| 38 | 20.3 | 2.8 | 23.1 |
| 39 | 20.3 | 2.8 | 23.1 |

| Sample No. | Quantity of Exposure to Steam (Torr · sec) | Quantity of Exposure to Oxygen (Torr · sec) | ΔC/N (dB) | Evaluation |
|---|---|---|---|---|
| 32 | $25 \times 10^{-6}$ | — | 1.6 | X |
| 33 | $11000 \times 10^{-6}$ | — | 1.9 | X |
| 34 | — | $7 \times 10^{-6}$ | 1.7 | X |
| 35 | — | $57 \times 10^{-6}$ | 2.0 | X |
| 36 | $31 \times 10^{-6}$ | — | 0.9 | ○ |
| 37 | $10000 \times 10^{-6}$ | — | 1.0 | ○ |
| 38 | — | $10 \times 10^{-6}$ | 0.9 | ○ |
| 39 | — | $49 \times 10^{-6}$ | 1.0 | ○ |

TABLE 5

| Sample No. | Tb (at %) | Cr (at %) | Tb + Cr (at %) |
|---|---|---|---|
| 40 | 21.7 | 1.3 | 23.0 |
| 41 | 21.7 | 1.3 | 23.0 |
| 42 | 21.7 | 1.3 | 23.0 |
| 43 | 21.7 | 1.3 | 23.0 |
| 44 | 21.7 | 1.3 | 23.0 |
| 45 | 21.7 | 1.3 | 23.0 |
| 46 | 21.7 | 1.3 | 23.0 |
| 47 | 21.7 | 1.3 | 23.0 |

| Sample No. | Quantity of Exposure to Steam (Torr · sec) | Quantity of Exposure to Oxygen (Torr · sec) | ΔC/N (dB) | Evaluation |
|---|---|---|---|---|
| 40 | $26 \times 10^{-6}$ | — | 1.6 | X |
| 41 | $11000 \times 10^{-6}$ | — | 2.0 | X |
| 42 | — | $7 \times 10^{-6}$ | 1.7 | X |
| 43 | — | $54 \times 10^{-6}$ | 1.9 | X |
| 44 | $31 \times 10^{-6}$ | — | 1.0 | ○ |
| 45 | $10000 \times 10^{-6}$ | — | 1.0 | ○ |

TABLE 5-continued

| | | | | |
|---|---|---|---|---|
| 46 | — | $10 \times 10^{-6}$ | 0.9 | ○ |
| 47 | — | $49 \times 10^{-6}$ | 1.0 | ○ |

TABLE 6

| Sample No. | Tb (at %) | Cr (at %) | Tb + Cr (at %) |
|---|---|---|---|
| 48 | 22.6 | 0 | 22.6 |
| 49 | 22.6 | 0 | 22.6 |
| 50 | 22.6 | 0 | 22.6 |
| 51 | 22.6 | 0 | 22.6 |
| 52 | 22.6 | 0 | 22.6 |
| 53 | 22.6 | 0 | 22.6 |
| 54 | 22.6 | 0 | 22.6 |
| 55 | 22.6 | 0 | 22.6 |

| Sample No. | Quantity of Exposure to Steam (Torr · sec) | Quantity of Exposure to Oxygen (Torr · sec) | ΔC/N (dB) | Evaluation |
|---|---|---|---|---|
| 48 | $27 \times 10^{-6}$ | — | 2.0 | X |
| 49 | $11000 \times 10^{-6}$ | — | 2.6 | X |
| 50 | — | $8 \times 10^{-6}$ | 1.9 | X |
| 51 | — | $53 \times 10^{-6}$ | 2.2 | X |
| 52 | $30 \times 10^{-6}$ | — | 1.0 | ○ |
| 53 | $10000 \times 10^{-6}$ | — | 1.0 | ○ |
| 54 | — | $11 \times 10^{-6}$ | 0.9 | ○ |
| 55 | — | $47 \times 10^{-6}$ | 1.0 | ○ |

Tables 2 to 6 showed results of evaluation of the recording characteristics of a plurality of samples manufactured such that the conditions under which the signal recording layer 3 was oxidized were varied. Note that the composition of the signal recording layer 3 of each of the samples shown in Tables 2 to 6 were the compositions with which relatively satisfactory results were obtained as shown in Table 1.

As shown in Tables 2 to 6, when the oxidized layer 4 was formed by oxidizing the signal recording layer 3 by performing the exposure to steam, ΔC/N was 1 dB or smaller in each case when the quantity of exposure to steam satisfied the range from $30 \times 10^{-6}$ Torr·sec to $10000 \times 10^{-6}$ Torr·sec. When the oxidized layer 4 was formed by oxidizing the signal recording layer 3 by performing the exposure to oxygen, ΔC/N was 1 dB or smaller when the quantity of exposure to oxygen satisfied the range from $10 \times 10^{-6}$ Torr·sec to $50 \times 10^{-6}$ Torr·sec.

In summary, it is preferable that the total quantity of Tb and Cr contained in the signal recording layer 3 is 24±1 at % when the signal recording layer 3 is made of TbFeCoCr. When the oxidized layer 4 is formed by oxidizing the surface of the signal recording layer 3, it is preferable that exposure to steam is performed by $30 \times 10^{-6}$ Torr·sec to $10000 \times 10^{-6}$ Torr·sec or exposure to oxygen is performed by $10 \times 10^{-6}$ Torr·sec to $50 \times 10^{-6}$ Torr·sec.

When the signal recording layer 3 is made of TbFeCo, it is preferable that the quantity of Tb contained in the signal recording layer 3 is 23.5±1 at %. When the oxidized layer is formed by oxidizing the surface of the signal recording layer 3, it is preferable that exposure to steam is performed by $30 \times 10^{-6}$ Torr·sec to $10000 \times 10^{-6}$ Torr·sec or exposure to oxygen is performed by $10 \times 10^{-6}$ Torr·sec to $50 \times 10^{-6}$ Torr·sec.

Hitherto, it has been said that somewhat low vertical magnetic anisotropy of the signal recording layer is required when magneto-optical recording is performed by the magnetic-field modulation method. The signal recording layer made of FeTbCoCr contains Cr which has another main function to lower the vertical magnetic anisotropy. However, raising of the recording density requires the vertical magnetic anisotropy of the signal recording layer to be raised in order to improve the recording characteristic. Therefore, rises in the recording density result in a requirement for a signal recording layer containing Cr in a small quantity and a signal recording layer which does not contain Cr.

Namely, when the signal recording layer is made of only FeTbCo without Cr, the vertical magnetic anisotropy of the signal recording layer can be raised to furthermore raise the recording density. Also in a case where the signal recording layer is made of FeTbCo without Cr, the present invention in which the quantity of Tb contained in the signal recording layer is made to be 23.5±1 at % and the oxidized layer is formed by oxidizing the surface of the signal recording layer enables the recording characteristics to be stable if the intensity of the recording magnetic field is somewhat changed.

As described above, according to the present invention, a magneto-optical recording medium can be provided with which a magneto-optical recording operation is performed by the magnetic-field modulation method and which is able to realize stable recording characteristic even if the intensity of the recording magnetic field is somewhat changed.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magneto-optical recording medium comprising:
    a disc substrate on which a first dielectric layer, a signal recording layer constituted by a thin film made of an alloy of a rare earth element and transition metal, an oxidized layer formed by oxidizing the surface of said signal recording layer after the signal recording layer is formed, a second dielectric layer, a light reflecting layer and a protective layer are sequentially formed so that magneto-optical recording of said signal recording layer is performed by a magnetic-field modulation method, wherein
    said signal recording layer is made of TbFeCo and Tb is contained in said signal recording layer in a quantity of 23.5±1 at %.

2. A magneto-optical recording medium according to claim 1, wherein
    a first dielectric layer, a signal recording layer constituted by a thin film made of an alloy of a rare earth element and transition metal, an oxidized layer formed by oxidizing the surface of said signal recording layer, a second dielectric layer, a light reflecting layer and a protective layer are sequentially formed on said disc substrate so that magneto-optical recording of said signal recording layer is performed by a magnetic-field modulation method, and
    a recording operation is performed with the intensity of a recording magnetic field which satisfies a range from 100 Oe to 300 Oe.

3. A magneto-optical recording medium according to claim 1, wherein
    a first dielectric layer, a signal recording layer constituted by a thin film made of an alloy of a rare earth element and transition metal, an oxidized layer formed by oxidizing the surface of said signal recording layer, a second dielectric layer, a light reflecting layer and a protective layer are sequentially formed on said disc substrate so that magneto-optical recording of said signal recording layer is performed by a magnetic-field modulation method, and a pit and projection pattern corresponding to servo signals and address signals and a pit and projection pattern corresponding to lands and grooves formed along recording tracks or meandered lands and grooves are provided for said disc substrate.

4. A method of manufacturing a magneto-optical recording medium which incorporates a signal recording layer made of TbFeCoCr so that magneto-optical recording of said signal recording layer is performed by a magnetic-field modulation method, said method of manufacturing a magneto-optical recording medium comprising the steps of:

forming said signal recording layer such that the total quantity of Tb and Cr contained in said signal recording layer is 24±1 at %; and then, exposing said formed signal recording layer to steam at $30 \times 10^{-6}$ Torr·sec to $10000 \times 10^{-6}$ Torr·sec or oxygen at $10 \times 10^{-6}$ Torr·sec to $50 \times 10^{-6}$ Torr·sec so that the surface of said signal recording layer is oxidized.

5. A method of manufacturing a magneto-optical recording medium which incorporates a signal recording layer made of TbFeCo so that magneto-optical recording of said signal recording layer is performed by a magnetic-field modulation method, said method of manufacturing a magneto-optical recording medium comprising the steps of:

forming said signal recording layer such that the total quantity of Tb contained in said signal recording layer is 23.5±1 at %; and then, exposing said formed signal recording layer to steam at $30 \times 10^{-6}$ Torr·sec to $10000 \times 10^{-6}$ Torr·sec or oxygen at $10 \times 10^{-6}$ Torr·sec to $50 \times 10^{-6}$ Torr·sec so that the surface of said signal recording layer is oxidized.

* * * * *